(No Model.)
W. LOUGHRIDGE.
DUMPING CART.
No. 270,905. Patented Jan. 23, 1883.
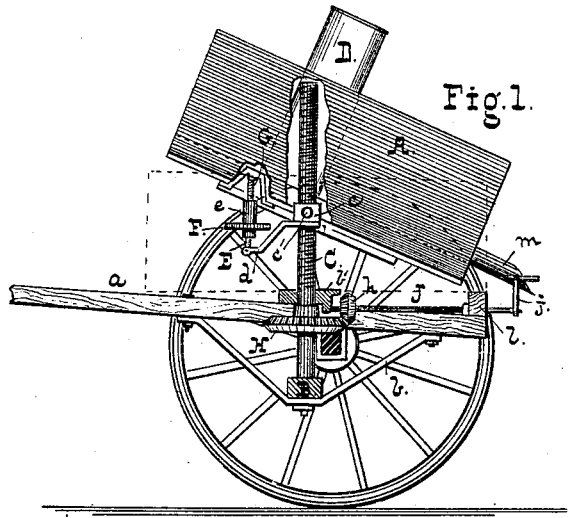
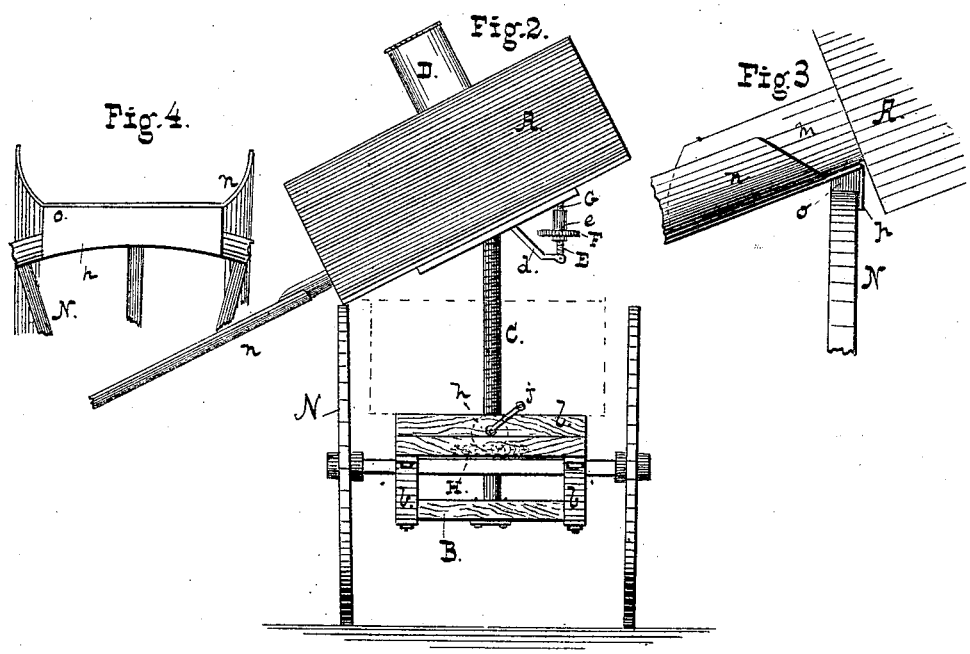

UNITED STATES PATENT OFFICE.

WILLIAM LOUGHRIDGE, OF BALTIMORE, MARYLAND.

DUMPING-CART.

SPECIFICATION forming part of Letters Patent No. 270,905, dated January 23, 1883.

Application filed June 7, 1882. (No model.)

*To all whom it may concern:*

Be it known that I, WILLIAM LOUGHRIDGE, of Baltimore city, State of Maryland, have invented certain new and useful Improvements in Dumping-Carts; and I hereby declare the same to be fully, clearly, and exactly described as follows, reference being had to the accompanying drawings, in which—

Figure 1 is a side elevation of the cart partly in section. Fig. 2 is an end elevation of the same. Fig. 3 is a side elevation of the rear end of the body and the chutes resting upon the wheel, and Fig. 4 is a rear elevation of the end of the removable chute.

My invention relates to dumping-carts in general, and in particular to that class of carts used for the delivery of coal in cities; and the object of my invention is to provide a cart the body of which shall be susceptible of elevation, of tilting about a horizontal axis, and of swiveling about a vertical axis, whereby certain advantages are secured, as hereinafter set forth.

Vehicles of this general class as heretofore constructed have been provided with mechanism for lifting the body of the cart to a sufficient height to cause the coal to roll by gravity through suitable chutes across the sidewalk and into the cellar-way; but no provision was made for causing the body to swivel with reference to the truck, so that the carts were necessarily backed to the curb to discharge the coal, and remained in that position, obstructing travel of vehicles and street-cars until the coal was discharged. To remedy this I mount the cart-body upon a strong vertical screw carried by the truck, whereby, upon turning the screw, the body is raised to the desired height to clear the wheel and then swivel round over the wheel, (upon which its end may be made to rest,) and the chutes are applied, as usual, to the end gate or spout. I apply also a simple tilting mechanism to give the cart-body the desired inclination after it is raised; or in lieu of this the bed of the cart may be inclined from front to rear.

In the drawings, A is the body, and $a$ the shafts, which extend back and are clipped to the axle, being connected at the rear by a beam, $l$.

B is a transverse beam, supported by straps $b$, bolted to the shafts, and in it is stepped a screw, C, which passes through a transverse beam, $b'$, also bolted to the shafts.

On the screw C is keyed a bevel-gear wheel, H, with which a smaller wheel, $h$, carried by the shaft J, meshes. On the end of the shaft J is a crank, $j$. A block or nut, $c$, is mounted on the screw C, and is provided with trunnions $c'$, that rest on suitable bearings on the under side of the body. A bracket or arm, $d$, is secured to the block $c$, and in its end is pivoted a screw, E, on which a sleeve, $e$, having a hand-wheel, F, turns. A screw, G, having an opposite thread to that of the screw E, enters the upper end of the sleeve $e$, and is pivoted on the under side of the body.

D is a casing, having flat sides and rounded ends, secured to the bottom of the cart, and inclosing the screw C, to protect it from access of coal-dust or grit. An end spout or chute, $m$, extends from the rear of the body, as usual.

In operation the cart is drawn up parallel to the curb, with the screw C about opposite the coal-hole. The crank $j$ is then turned, causing the body A to rise on the screw to the desired height, when it is swung round to bring its rear end over the wheel. The wheel F is then turned so as to unscrew the sleeve $e$ on the screws E and G, and thereby tilt the body on the trunnions $c'$. By preference it is tilted until its end rests on the wheel N, as the strain upon the screw is thereby in great measure relieved. The chutes are finally applied and the coal is discharged, as usual, the body being afterward lowered and leveled by turning the wheel and crank in the reverse direction.

In Figs. 3 and 4 is shown a device for connecting the extension-chutes with the body, and for supporting the latter upon the wheel. The end chute, $n$, is provided with a block, $o$, having a curvature to fit upon the wheel-rim, and a flange, $p$, to fall behind it and prevent the chute from slipping back. In using this device it is laid in position upon the wheel N, as shown, and the body A is tilted to lower the chute $m$ within the lower chute, $n$.

Instead of operating the sleeve $e$ by means of the hand-wheel F, it may be turned by a suitable crank-shaft or other well-known device.

I have shown in the accompanying drawings, and have described, what I deem the best and simplest form of mechanism for raising and tilting the body, and for admitting of a swiveling motion of the same about a vertical axis; but it is obvious that other well-known mechanical appliances for accomplishing these ends may be used—such, for instance, as a plunger elevated within a sheath by hydraulic pressure, and having the cart-body pivoted upon its upper end.

Having thus described my invention, what I claim as new, and desire to secure by Letters Patent, is—

1. In combination with the body of a dumping-cart, mechanism, substantially as described, for elevating and tilting the body, adapted to admit of a swiveling motion of the same about a vertical axis, as and for the purpose set forth.

2. In combination with the truck of a dumping-cart, a vertical shaft or screw on which the body is adapted to swivel and be raised, and means for tilting the body when the proper elevation is attained, as set forth.

3. In combination with the truck of a dumping-cart, a vertical screw on which is mounted a block or nut having trunnions on which the body is mounted, and a tilting device and means for rotating the screw, as and for the purpose set forth.

4. In combination with the screw, the cart-body mounted thereon, as described, and having a sheath or casing for inclosing and protecting the screw, made oblong in the direction of the length of the body, whereby the latter is adapted to tilt about a horizontal axis, as set forth.

5. In combination with the truck of a cart, a body mounted upon a vertical shaft carried by the truck and arranged to swivel, so as to rest upon the wheel, as and for the purpose set forth.

6. In combination with the elevating and swiveling body, the chute $n$, adapted to engage with the wheel-rim, substantially as set forth.

WM. LOUGHRIDGE.

Witnesses:
R. D. WILLIAMS,
WILLIAM DEMUTH.